Feb. 4, 1964  G. R. BIRD  3,120,608
GAS MICROCELL IN THE FORM OF A LIGHT PIPE FOR
USE WITH AN INFRARED SPECTROMETER
Filed April 27, 1961

INVENTOR.
George R. Bird
BY
Brown and Mikulka
and
Wilfred J. Baranick
ATTORNEYS

United States Patent Office 3,120,608
Patented Feb. 4, 1964

3,120,608
GAS MICROCELL IN THE FORM OF A LIGHT PIPE FOR USE WITH AN INFRARED SPECTROMETER
George R. Bird, Concord, Mass., assignor to Polaroid Corporation, Cambridge, Mass., a corporation of Delaware
Filed Apr. 27, 1961, Ser. No. 106,008
9 Claims. (Cl. 250—43.5)

This invention relates to a device for use in the examination of gases and more particularly to an optical cell for making infrared absorption measurements on very small gas volumes.

A principal object of the present invention is to provide a simple, inexpensive and efficient gas microcell for use in or with suitable analytical instruments.

Another object of the invention is to provide a novel gas microcell for infrared spectroscopy.

Still another object of the invention is to provide a novel assemblage for infrared spectroscopy comprising, in combination, a microcell of the above type and suitable mirror means for imaging the spectrometer light source at the entrance end of the microcell.

Other objects of the invention will in part be obvious and will in part appear hereinafter.

The invention accordingly comprises the apparatus or devices possessing the construction, combination of elements and arrangement of parts which are exemplified in the following detailed disclosure, and the scope of the application of which will be indicated in the claims.

Figure 1:
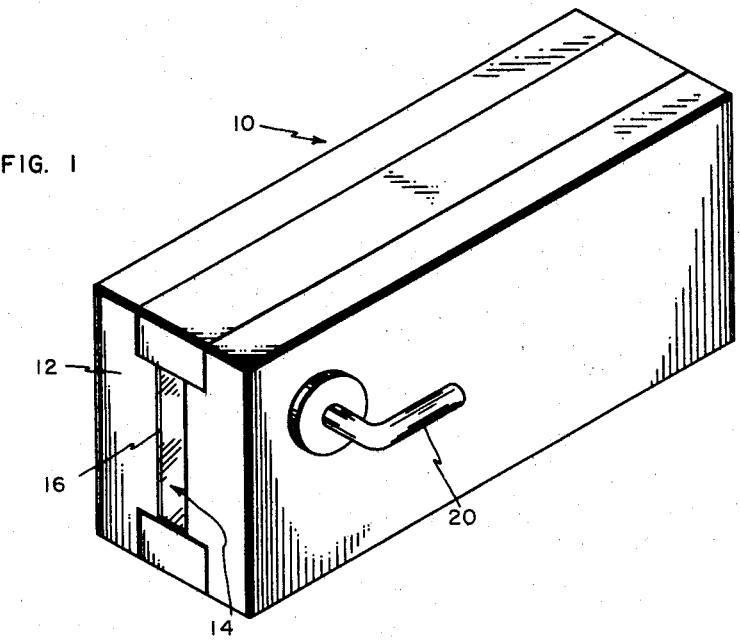
Figure 2:
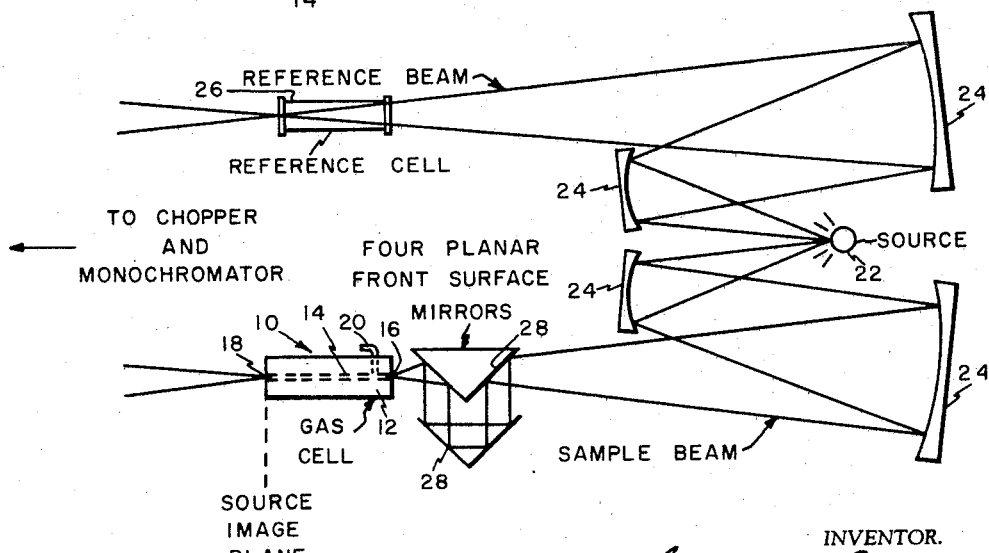

For a fuller understanding of the nature and objects of the invention, reference should be had to the following detailed description taken in connection with the accompanying drawings wherein:

FIGURE 1 is an exaggerated, isometric view of a gas microcell of the present invention; and FIG. 2 is a diagrammatic view showing one use of a gas microcell of the present invention with an infrared spectrometer.

It is now common practice to observe infrared spectra of one microgram liquid or solid samples using a beam condensing optical system. Gas samples, however, require an optical pathlength of several centimeters, e.g., 7.5 cm., and so cannot be placed at the focus of a beam condensing system. Large and small multiple path gas cells are used, but these share with ordinary gas cells the relatively large volume, e.g., 25–50 cm.³ dictated by the conical shape of the beam approaching the monochromator entrance slit of an infrared spectrometer. In the present invention there is provided a gas microcell particularly suitable for infrared spectroscopy which is of small volume and of any appropriate optical pathlength yet which does not cause a large reduction in light intensity or efficiency. The present microcell permits reduction of the volume of gas necessary from present levels of 25–50 cm.³ to substantially lower levels, for example, 1.0 cm. or less. The microcell of the present invention comprises an elongated body or member which includes a chamber or cavity which is substantially coextensive in length with said body, the ends of the chamber being preferably closed by means of thin transparent windows. The walls of the chamber are of a highly light reflective nature so as to secure more efficient light transmission through the chamber. Conduit means are provided for introducing gas samples into the chamber. In one preferred embodiment of the invention, the chamber is of a uniform small rectangular cross-section. When the microcell of the present invention is used in an existing conventional infrared spectrometer, there is preferably employed therewith suitable mirror means such as, for example, four planar, front surface mirrors, for folding the source beam so that the light source is imaged at the light entrance end of the microcell.

Referring now to FIGURE 1, wherein there is shown in exaggerated form a microcell 10 comprising an elongated hollow body or member 12 which provides therethrough a chamber or cavity 14, the walls or surfaces of the chamber being of a highly light reflective nature. The ends of chamber 14 are preferably closed by means of transparent windows 16 and 18 (shown in FIG. 2). The windows, suitably secured to the ends of chamber 14 may comprise thin cleavage sections of rock salt or other suitable material. At least one suitably located conduit means 20 extends through body 12 and into communication with chamber 14 so as to permit the introduction and withdrawal of gases from chamber 14. The above microcell may also be termed or described as a "light pipe."

As illustrated, elongated chamber 14 is preferably of a uniform rectangular cross-section and substantially coextensive in length with body 12. The dimensions of chamber 14 are determined by the spectrometer optics and by the gas samples to be observed. Optical pathlengths of several centimeters are usually required for ordinary gases at $\frac{1}{10}$ to 1 atmosphere pressure. The length of chamber 14 and hence microcell 10 thus may be varied considerably, e.g., 10 cm., 7.5 cm. or less. The height and width of chamber 14 are determined by the shape of the spectrometer entrance slit, the width being comparable to the widest slit setting commonly employed, and the height being at least equal to the height of the entrance slit. Typical dimensions, for example, might be 0.05 cm. wide x 1.0 cm. high x 7.5 cm. long, or 0.05 cm. wide x 1.0 cm. high x 10 cm. long for a chamber volume of 0.5 cm.³ or 0.106 cm. wide x 1.27 cm. high x 7.7 cm. long for an internal volume of 1.0 cm.³.

To provide for the more efficient transmission of light through chamber 14 which is of very small cross-section, the walls or surfaces of chamber 14 preferably comprise a highly reflective metal. The chamber walls may be made of a highly reflective metal or coated by vacuum deposition techniques or other well-known coating methods with a highly reflective metal. With chamber walls formed of or coated with an efficient reflective metal such as, for example, gold, aluminum, rhodium, silver and the like, reflection losses are reduced, thus preventing excessive light loss and permitting good light transmission. Preferably the chamber walls provide a high infrared reflection such as may be obtained with a gold coating or the like. The middle-infrared reflection from gold is about 98.5 percent of incident light at vertical incidence.

Microcell body 12 may be formed from a large number of materials, for example, metal, glass and the like and may be constructed in many ways. For instance, the microcell may be made of glass with the chamber walls coated with a metal such as gold and the windows comprising thin cleavage sections of rock salt. The microcell may also be made of metal such as stainless steel, brass and the like with the chamber walls or surfaces being highly polished. These highly polished chamber walls may also be coated with a highly reflective metal such as gold.

Although microcell body 12 may be formed from more than one piece such as illustrated, it may also be fabricated in a single piece such as by employing electroforming methods. Likewise, although microcell body 12 is illustrated as being of an overall rectangular or parallelepiped configuration, it may be of some other desirable shape which also provides the preferred chamber or cavity 14.

Most spectrometer entrance slits are curved to correct for aberrations in the monochromator. The microcells described above are provided with chamber dimensions large enough to fill this curved slit. Further volume reduction by at least one half can be obtained by employing a non-rectangular chamber or by utilizing straight entrance and curved exit slits. An even greater reduction in sample volume is obtainable in principle through the use of condensing optics.

When condensing optics are employed, a sample cross-section may be reduced by the ratio of numerical apertures of the condenser to the sample spectrometer. With present instruments, this is roughly about 6. Thus the dimensions of the present microcell might be reduced to 0.016 cm. wide x .16 cm. high x 1.0 cm. long for a chamber volume of 0.0026 cm.$^3$. The shorter pathlength would be necessitated by the increased reflection losses with narrower spacing and higher numerical aperture. A higher gas pressure would be required with weakly absorbing gases to compensate for decreased pathlength.

Referring now to FIG. 2 wherein like numbers refer to like elements of FIG. 1, the use of microcell 10 with a typical double beam infrared spectrometer is illustrated. Since the constructions of single and double beam infrared spectrometers are so well known, their many details need not be illustrated or described here. Generally, however, infrared spectrometers comprise a source such as a Nernst filament or Globar which provides radiation over the whole infrared spectrum, a monochromator which disperses this light and then selects a narrow frequency range, the energy of which is measured by a detector; the detector transforms energy received into an electrical signal which is then amplified and registered by a recorder. The whole light path and focusing of the source image on the detector is achieved by precision mirrors.

In FIG. 2 there is illustrated a spectrometer light source 22, a plurality of mirrors 24 to give identical reference and sample beams, and a reference cell 26 and a sample gas microcell 10 positioned in the two narrow beams. Transmitted light from the cells is directed to the monochromator, details of which are not shown.

To secure efficient light transmission through microcell 10, imaging techniques at one or both ends of the microcell are employed. The spectrometer light source or source image is generally larger than the height and maximum width of the monochromator entrance slit (not shown) so it is easy to throw a focused image of the source on one end of microcell 10 which has a chamber with rectangular cross-sectional dimensions which are smaller than the source and larger than the monochromator entrance slit. One end of the microcell chamber 14 is filled with a focused image of the source and the other end is positioned at the original source image point or plane as illustrated or at the monochromator entrance slit. When one end of the gas microcell is positioned at a source image point as shown, a second focusing system (not shown) to image the microcell chamber exit on the spectrometer entrance slit is employed.

To fit microcell 10 into conventional infrared spectrometers, the exit end is preferably placed at the original source image plane and the converging light beam from light source 22 is foreshortened or folded by suitable mirror means 28, here shown as a set of four plane mirrors predeterminedly spaced from the light entrance end of microcell 10 so that the source image at the sampling station is moved back to the light entrance end of microcell 10. As shown, two of the four plane, front surfaced mirrors 28 are adjacent faces of a 90 degree prism. The distance from the apex of the prism to the apex of the other two mirrors is just half the length of the microcell. These four plane mirrors may be suitably attached to the gas microcell so as to permit the auxiliary mirrors and microcell to be added or removed as accessories without otherwise altering the spectrometer.

One preferred manner of use of the microcell of the present invention is as illustrated in FIG. 2, that is, with the exit end of the microcell placed at the source image plane. In operation, a gas sample is transferred into the microcell chamber by any well-known technique. For example, the sample may be transferred by freezing with Dry Ice or liquid nitrogen into a small U-tube connected to the conduit means 20 of the microcell. On warming, the gas fills the microcell chamber and the U-tube. With capillary tubing, the volume of the U-tube may be less than that of the microcell chamber so that most of the gas enters the microcell. Light from radiation source 22 is reflected by mirrors 24 to provide identical sample and reference beams. The sample beam is folded or foreshortened by the four plane, front surfaced mirrors 28 so that a focused image of the spectrometer source is thrown on the end of the microcell chamber nearest the four plane mirrors. This image fills the chamber entrance and overlaps the edges. The beam impinged on the end of the microcell chamber travels down the chamber making a number of reflections off the highly reflective metal walls. The beam is contained by the highly reflective metal walls and the reflections occur at the metal-gas interface. The beam exiting from the microcell chamber is then imaged on the spectrometer entrance slit by using a second focusing system which is not shown.

The microcell of the present invention finds wide use in infrared spectroscopy. One important use for such cell is in connection with examining gas fractions or samples collected from a gas chromatograph and particularly for examining the small impurity fractions from the gas chromatograph. The microcell may also be useful for observing or examining expensive or highly radioactive isotopic compounds.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. For use with an infrared spectrometer in the analysis of a relatively small volume of gas wherein the spectrometer includes a light source, means for focusing an image of said light source, and a monochromator entrance slit, a gas microcell in the form of a light pipe positionable between said light source and said slit comprising a body having an elongated gas-receiving chamber therein, said chamber having windows in opposite ends thereof for the passage of light therethrough from said light source to said slit, the walls of said chamber between said windows being highly light reflective, the end of said chamber nearest said light source being adapted to receive a focused image of said light source which at least fills said end, said chamber having a cross-sectional configuration and a length such that the light focused on said one end when traveling through said chamber makes a number of reflections off said highly reflective wall.

2. The invention defined by claim 1 wherein the cross-section of said chamber is substantially uniform throughout the length of said chamber and when taken perpendicularly to its direction of elongation is substantially rectangular.

3. The invention defined by claim 2 wherein the width and height of said rectangular cross-section is at least equal to the width and height of said slit.

4. The invention defined by claim 3 wherein the light-reflective walls of said chamber comprise a highly light-reflective metal.

5. The invention defined by claim 4 wherein said highly light-reflective metal is gold.

6. The invention defined by claim 5 wherein conduit means are provided for introducing gas to be analyzed into said chamber.

7. The invention defined by claim 1 wherein the volume of said chamber is on the order of one cubic centimeter.

8. The invention defined by claim 1 including, in combination therewith, means predeterminedly spaced from said one end of said chamber for foreshortening the light beam coming from said light source.

9. The invention defined by claim 1 wherein the cross-section of said chamber is substantially uniform throughout the length of said chamber.

References Cited in the file of this patent
UNITED STATES PATENTS

| | | |
|---|---|---|
| 2,212,211 | Pfund | Aug. 20, 1940 |
| 2,534,657 | Bray | Dec. 19, 1950 |
| 2,547,212 | Jamison et al. | Apr. 3, 1951 |
| 2,709,751 | Meyer | May 31, 1955 |
| 3,036,215 | Jones et al. | May 22, 1962 |

UNITED STATES PATENT OFFICE
CERTIFICATE OF CORRECTION

Patent No. 3,120,608 — February 4, 1964

George R. Bird

It is hereby certified that error appears in the above numbered patent requiring correction and that the said Letters Patent should read as corrected below.

Column 1, line 57, for "1.0 cm." read -- 1.0 cm.$^3$ --; column 4, line 29, for "such cell" read -- such a cell --.

Signed and sealed this 14th day of July 1964.

(SEAL)

Attest:

ESTON G. JOHNSON
Attesting Officer

EDWARD J. BRENNER
Commissioner of Patents